United States Patent
Andrews et al.

(10) Patent No.: US 7,447,738 B1
(45) Date of Patent: *Nov. 4, 2008

(54) COMPONENT DOWNLOAD SELECTION MECHANISM FOR WEB BROWSERS

(75) Inventors: Gregory P. Andrews, Rochester, MN (US); Kevin P. Gibson, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 08/818,158

(22) Filed: Mar. 14, 1997

(51) Int. Cl.
*G06F 15/16* (2006.01)

(52) U.S. Cl. .................. 709/204; 715/251; 715/205

(58) Field of Classification Search ............ 395/200.48, 395/353, 610, 712; 707/9, 507, 501, 505, 707/10; 345/156, 302, 329, 780; 709/104, 709/229, 227, 223, 217, 200, 202, 203, 204, 709/213, 219, 246, 248, 218, 206; 348/10; 714/47; 350/400; 310/401; 717/11, 178; 370/466; 358/1.18; 379/88.17; 705/26, 705/27, 39; 715/501, 854
See application file for complete search history.

(56) References Cited

U.S. PATENT DOCUMENTS

| | | | | |
|---|---|---|---|---|
| 5,251,153 A * | 10/1993 | Nielsen et al. | ............... | 700/284 |
| 5,533,176 A * | 7/1996 | Best et al. | .................. | 358/1.18 |
| 5,552,897 A * | 9/1996 | Mandelbaum et al. | ...... | 358/400 |
| 5,630,066 A * | 5/1997 | Gosling | ....................... | 709/217 |
| 5,675,507 A * | 10/1997 | Bobo, II | ..................... | 709/206 |
| 5,689,668 A * | 11/1997 | Beaudet et al. | ............. | 395/353 |
| 5,706,502 A * | 1/1998 | Foley et al. | ................. | 395/610 |
| 5,708,825 A * | 1/1998 | Sotomayor | .................. | 707/501 |
| 5,721,827 A * | 2/1998 | Logan et al. | ................. | 709/217 |
| 5,731,805 A * | 3/1998 | Tognazzini et al. | ......... | 345/156 |
| 5,737,599 A * | 4/1998 | Rowe et al. | ................... | 707/10 |
| 5,740,549 A * | 4/1998 | Reilly et al. | .................. | 705/14 |
| 5,758,126 A * | 5/1998 | Daniels et al. | .............. | 345/780 |
| 5,765,507 A * | 6/1998 | Gallego | ....................... | 119/651 |
| 5,794,259 A * | 8/1998 | Kikinis | ....................... | 707/507 |
| 5,801,689 A * | 9/1998 | Huntsman | .................... | 345/329 |
| 5,801,702 A * | 9/1998 | Dolan et al. | ................. | 715/854 |
| 5,802,299 A * | 9/1998 | Logan et al. | ........... | 395/200.48 |
| 5,802,518 A * | 9/1998 | Karaev et al. | ................... | 707/9 |
| 5,805,676 A * | 9/1998 | Martino | .................... | 379/93.17 |
| 5,809,250 A * | 9/1998 | Kisor | ........................ | 709/227 |
| 5,862,325 A * | 1/1999 | Reed et al. | ................... | 709/104 |
| 5,862,339 A * | 1/1999 | Bonnaure et al. | ........... | 709/227 |

(Continued)

OTHER PUBLICATIONS

Hurley et al, Telephone Data Collection Using the World Wide Web, IEEE, Oct. 1996.*

(Continued)

*Primary Examiner*—Thong H Vu
(74) *Attorney, Agent, or Firm*—Wood, Herron & Evans, LLP

(57) ABSTRACT

A method and apparatus for selectively downloading components over the World-Wide-Web is provided. The preferred embodiment uses a download selection mechanism to display a download selection list to a web browser user. The list allows web user to decide which components to download and which to not download, thereby giving the web user more control over the speed of their Internet accesses. The preferred method produces a table or chart of components and allows the web user to select which components are downloaded.

36 Claims, 9 Drawing Sheets

U.S. PATENT DOCUMENTS

| | | | |
|---|---|---|---|
| 5,889,958 A * | 3/1999 | Willens | 709/229 |
| 5,909,545 A * | 6/1999 | Frese, II et al. | 709/208 |
| 5,914,746 A * | 6/1999 | Matthews, III et al. | 348/10 |
| 5,915,096 A * | 6/1999 | Rosenzweig et al. | 709/227 |
| 5,923,738 A * | 7/1999 | Cardillo et al. | 379/93.25 |
| 5,926,624 A * | 7/1999 | Katz et al. | 709/217 |
| 5,940,395 A * | 8/1999 | Fraenkel et al. | 370/401 |
| 5,941,957 A * | 8/1999 | Ingrassia et al. | 709/248 |
| 5,944,791 A * | 8/1999 | Scherpbier | 709/218 |
| 5,948,040 A * | 9/1999 | DeLorme et al. | 701/201 |
| 5,953,005 A * | 9/1999 | Liu | 345/302 |
| 5,956,484 A * | 9/1999 | Rosenberg et al. | 709/203 |
| 5,958,008 A * | 9/1999 | Pogrebisky et al. | 709/223 |
| 5,961,602 A * | 10/1999 | Thompson et al. | 709/229 |
| 5,974,572 A * | 10/1999 | Weinberg et al. | 714/47 |
| 5,978,847 A * | 11/1999 | Kisor et al. | 709/227 |
| 5,995,756 A * | 11/1999 | Herrmann | 395/712 |
| 5,996,007 A * | 11/1999 | Klug et al. | 709/218 |
| 6,005,561 A * | 12/1999 | Hawkins et al. | 715/500.1 |
| 6,006,034 A * | 12/1999 | Heath et al. | 717/11 |
| 6,012,083 A * | 1/2000 | Savitzky et al. | 709/202 |
| 6,029,180 A * | 2/2000 | Murata et al. | 715/501.1 |
| 6,035,330 A * | 3/2000 | Astiz et al. | 709/218 |
| 6,044,382 A * | 3/2000 | Martino et al. | 707/505 |
| 6,052,717 A * | 4/2000 | Reynolds et al. | 709/218 |
| 6,084,528 A * | 7/2000 | Beach et al. | 340/5.9 |
| 6,098,092 A * | 8/2000 | Padzensky | 709/203 |
| 6,112,239 A * | 8/2000 | Kenner et al. | 709/224 |
| 6,131,116 A * | 10/2000 | Riggins et al. | 709/219 |
| 6,181,781 B1 * | 1/2001 | Porter et al. | 379/88.17 |
| 6,188,683 B1 * | 2/2001 | Lang et al. | 370/352 |
| 6,285,683 B1 * | 9/2001 | Lin | 370/466 |
| 6,292,828 B1 * | 9/2001 | Williams | 709/218 |
| 6,317,777 B1 * | 11/2001 | Skarbo et al. | 709/204 |
| 6,424,991 B1 * | 7/2002 | Gish | 709/203 |
| 6,487,588 B1 * | 11/2002 | Phillips et al. | 709/218 |
| 6,505,242 B2 * | 1/2003 | Holland et al. | 709/219 |
| 6,594,692 B1 * | 7/2003 | Reisman | 709/219 |
| 6,883,020 B1 * | 4/2005 | Taranto et al. | 709/213 |
| 7,110,981 B1 * | 9/2006 | Sidikman et al. | 705/43 |
| 7,225,142 B1 * | 5/2007 | Apte et al. | 705/14 |

OTHER PUBLICATIONS

Hemphill et al, Speech-Aware Multimedia, IEEE 1996.*
Chap8p1—Converted ; www.zocalo.net/tng/book/Chap8.html.*
www.harbornet.com/ken/nicv1i04.txt; www.harbornet.com/ken/nicv1i04.txt.*
VEMMI: a new On-Line Client/Server Multimedia Protocol for the Internet; www.w3.org/AudioVideo/9610_Workshop/paper24/paper24.html.*

* cited by examiner

```
<HTML>

<TITLE> WALT'S WEB PAGE </TITLE>

<BODY background=background.jpg>

<center>

<APPLET Code="DancingMelon.class" Width = "600" Height = "300">
</APPLET>

</center>

<p>

<HEAD> Walts World of Melons </HEAD>

<p>

<IMG SRC ="http://www.walt.com/images/watermelon.gif" ALIGN= "LEFT"
ALT="WaterMelon GIF"

<IMG SRC ="http://www.walt.com/images/cantalope.jpg" ALIGN= "RIGHT"
ALT="Cantalope JPEG"

<p>

<IMG SRC ="http://www.walt.com/images/honeydew.gif" ALIGN= "TOP"
ALT="Honey Dew GIF"

<p>

To place an order call 1-800-Melons or click
<A HREF ="mailto:melons@walt.com">HERE</A>

</BODY>
</HTML>
```

Component Download Table

| Component File | Title | Type | Length | bytes/%transferred |
|---|---|---|---|---|
| walts.HTML | Walt's Home Page | HTML | 1000 | 1000/100% |
| background.jpg | | Background | 25KB | 23KB/92% |
| dancingmelon.class | Dancing Applet | Applet | 22KB | 11KB/50% |
| watermelon.gif | Watermelon GIF | GIF Image | 57KB | 25KB/47% |
| cantalope.jpg | Cantalope JPEG | JPEG Image | ?? | 15KB/??% |
| honeydew.gif | Honeydew GIF | GIF Image | ?? | 0KB/??% |

COMPONENT DOWNLOAD SELECTION MECHANISM FOR WEB BROWSERS

BACKGROUND OF THE INVENTION

1. Technical Field

The present invention relates in general to the Internet. More specifically, the present invention relates to the field web browsers.

2. Background Art

The development of the EDVAC computer system of 1948 is often cited as the beginning of the computer era. Since that time, computer systems have evolved into extremely sophisticated devices that may be found in many different settings. Computer systems typically include a combination of hardware (e.g., semiconductors, circuit boards, etc.) and software (e.g., computer programs). As advances in semiconductor processing and computer architecture push the performance of the computer hardware higher, more sophisticated computer software has evolved to take advantage of the higher performance of the hardware, resulting in computer systems today that are much more powerful that just a few years ago.

Other changes in technology have also profoundly affected how we use computers. For example, this widespread proliferation prompted the development of computer networks that allow computers to communicate with each other. With the introduction of the personal computer (PC), computing became accessible to large numbers of people. Networks for personal computers were developed to allow individual users to communicate with each other. In this manner, a large number of people within a company could communicate at the same time with a software application running on one computer system.

One significant computer network that has recently become very popular is the Internet. The Internet grew out of the modern proliferation of computers and networks, and has evolved into a sophisticated worldwide network of computer systems linked together that collectively make up the "worldwide web", or WWW. A user at an individual PC or workstation that wishes to access the WWW, typically does so using a software application known as a web browser. Web browsers communicate with computer systems called web servers. The communication between web browsers and web servers can be done according to any of several Internet protocols (e.g., hypertext transfer protocol (http); file transfer protocol (ftp); Internet Inter-Orb Protocol (IIOP).

Information transmitted from the web server to the web browser is generally formatted using a specialized language called Hypertext Markup Language (HTML). HTML is a language that describes the structure of a document in a standard way that web browsers are able to understand and interpret. An HTML document stored on a web server, commonly called a "web page," can thus be downloaded by any web browser and displayed on the client machine. HTML allows web pages to be linked together using hypertext. Hypertext is a method of organizing text, graphics and other kinds of data that lets individual data elements point to one another. Thus, by using hypertext to link pages together web client users can selectively view pages that interest them.

Many web pages use extensive graphics and other "components" to dress up their web page, where components are defined in this patent to be any additional items referenced in HTML documents. These components are included in an HTML document through the use of specialized tags. For example, the image tag <IMG> is used to insert a graphics image that is a component in the HTML document. Likewise, the applet tag <Applet> is used to insert an applet, a small program designed to be downloaded and run on the web client, into the HTML document.

When the web browser requests a page, the HTML document is first downloaded to the browser. The web browser then automatically requests the various components that are referenced in the HTML document. The server then downloads the components to the web browser so that the web browser can then display the completed web page to the user. This process happens automatically and without the web client user having any control over the process.

In many cases, the extra components are not of interest to a particular web client user. For example, a component may comprise a graphics image advertisement for a product that does not interest the user. In another case, the component may comprise an applet which performs a function that the user does not need or want to be performed. A component could also comprise a form that the user does not need or wish to have. In all of these cases, the components comprise items which the user does not desire to download.

Furthermore, these undesirable components can be very large. A typical graphics image file could comprise hundreds of kilobytes. Downloading such unwanted graphics files may take considerable time to download depending on the users method of access to the Internet. During this time the user may be unable to proceed and is forced to wait for all the components to download. Thus, many users are forced to spend valuable time waiting for all components to download to their web browser before they can proceed with whatever task they have.

Without an improved browser, web client users will have to continue to wait for the download of each and every unwanted component before being able to proceed with what they want to do. It is easy to see that this situation is undesirable from the perspective of the web browser user.

SUMMARY OF THE INVENTION

According to the present invention, a method and apparatus for selectively downloading components over the World-Wide-Web is provided. The preferred embodiment uses a download selection mechanism to display a download selection list to a web browser user. The list allows a web user to decide which components to download and which to not download, thereby giving the web user more control over the speed of their Internet accesses. The preferred method produces a table or chart of components and allows the web user to select which components are downloaded.

BRIEF DESCRIPTION OF THE DRAWINGS

FIG. 4 is a representative HTML document;

DESCRIPTION OF THE PREFERRED EMBODIMENTS

The present invention relates to the use of web browsers to download documents over the World-Wide-Web. For those that are not experts in the field, the Overview section below provides general background information on document transfers between web servers and web browsers over World-Wide-Web.

Overview—World-Wide-Web Document Transfers

Figure 3:
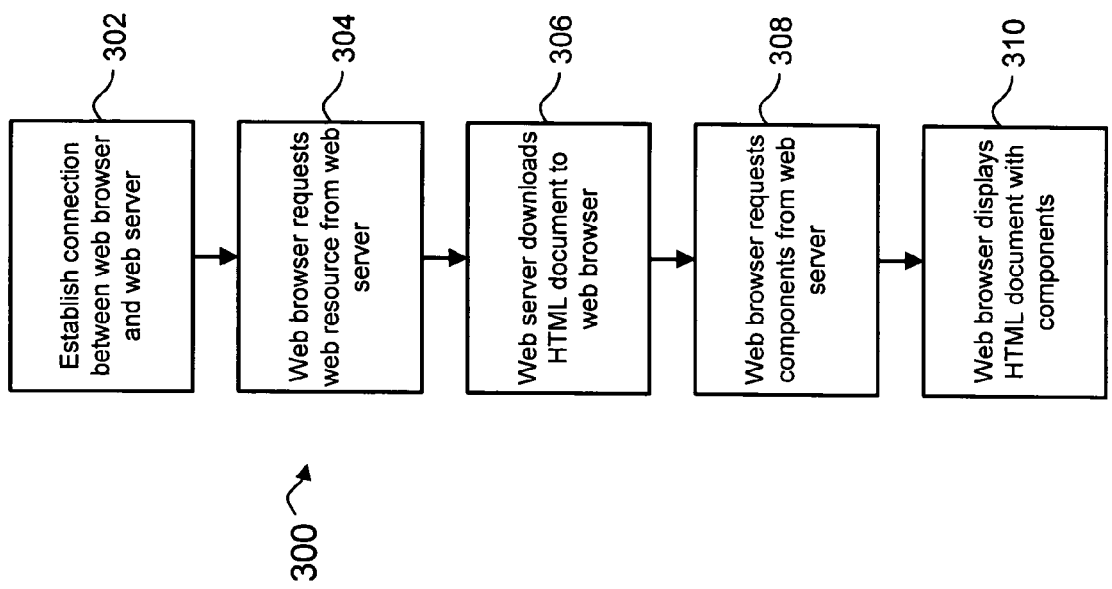
FIG. 3 is a flow diagram representing a document download method.

Transfers between web servers and web browsers are usually in the form of the web browser requesting a web resource, and the web server downloading the requested resources to the web browser. Turning to FIG. 3, an HTML download method 300 is illustrated. The download method 300 is consistent with typical web browser—web server interactions.

The first step 302 is to establish a connection between the web browser and the web server. Typically, the web client user enters a Uniform Resource Locator (URL) for a desired web resource into his web browser. The URL of a resource can be manually typed into the computer or entered automatically through the use of a hypertext link on another web resource. A URL is a standard address used to identify resources that are accessible through the WWW. The URL of a resource describes the protocol needed to access it and points to its web server, Internet location, and home directory.

The web browser sends a message to the web server specified in the URL requesting that a connection be established. Web servers listen for requests that are directed to them and can recognize requests as being for one of its resources. The web server can either accept or reject the request for the connection, and sends a message to the web browser to that effect. Many web browsers display a message such as "Connect: contacting host www.server.com" while establishing a connection with the server.

When the connection is established, the next step 304 is for the web browser to send a request for a particular web resource. This involves sending the URL for the web resource to the web server. This is typically done automatically by the web browser after the connection is established. The web server receives the request and either delivers the requested web resource or sends an error message explaining why it cannot. If the web server sends the requested web resource, it will do so in the manner requested by the web browser. For example, if the URL included the term "http," the web server will send the web resource using the hypertext transfer protocol.

The next step 306 in delivering the resource to the web browser involves sending the HTML document to the web browser. The HTML document includes the text and formatting information that determine the documents layout. A HTML document may also include references to one or more components. These components can include any item referenced in the HTML page to be downloaded and integrated with the page, such as graphics images, background images, audio, video and multimedia files, forms, applets etc. At this time typical web browsers display icons for graphic images and other components that are to be downloaded later. The icons are replaced by the component once the relevant files have been received.

Turning briefly to FIG. 4, an example HTML document 400 is illustrated. The HTML document 400 is a web page advertising "Walts World of Melons." The HTML document 400 is illustrative of the kind of features that are typically found in a web page, although actual HTML documents are likely to be much more complex.

The HTML document 400 includes references to five components: an applet, three images and a background image. In particular, an applet (a small program designed to be downloaded and run on the web client) called "DancingMelon.class" is referenced by the <APPLET> tag. The applet tag specifies the location of the applet on the web server, and causes the web server to download the specified applet to the web browser.

Likewise, three images are referenced in the document. Two of the images, watermelon.gif and Honeydew.gif are Graphics Image Format (GIF) files. The other, cantalope.jpg is a Joint Photographic Expert's Group (JPEG) file. The images are referenced by the <IMG> tag, and include the URL for the image file, location information and alternative reference title for the image. An additional image, background.jpg is referenced for use as a background component in the web page. As stated before, there are many more components which can be referenced in an HTML document, and these four are simply illustrative of the several types commonly found.

Returning to FIG. 3, in the next step 308, the web browser automatically requests the components referenced in the HTML document from the web server. This is done by sending the URL for the component, which was contained in the components tag, to the web server. The web server then delivers the requested components to the web browser.

Figure 5:
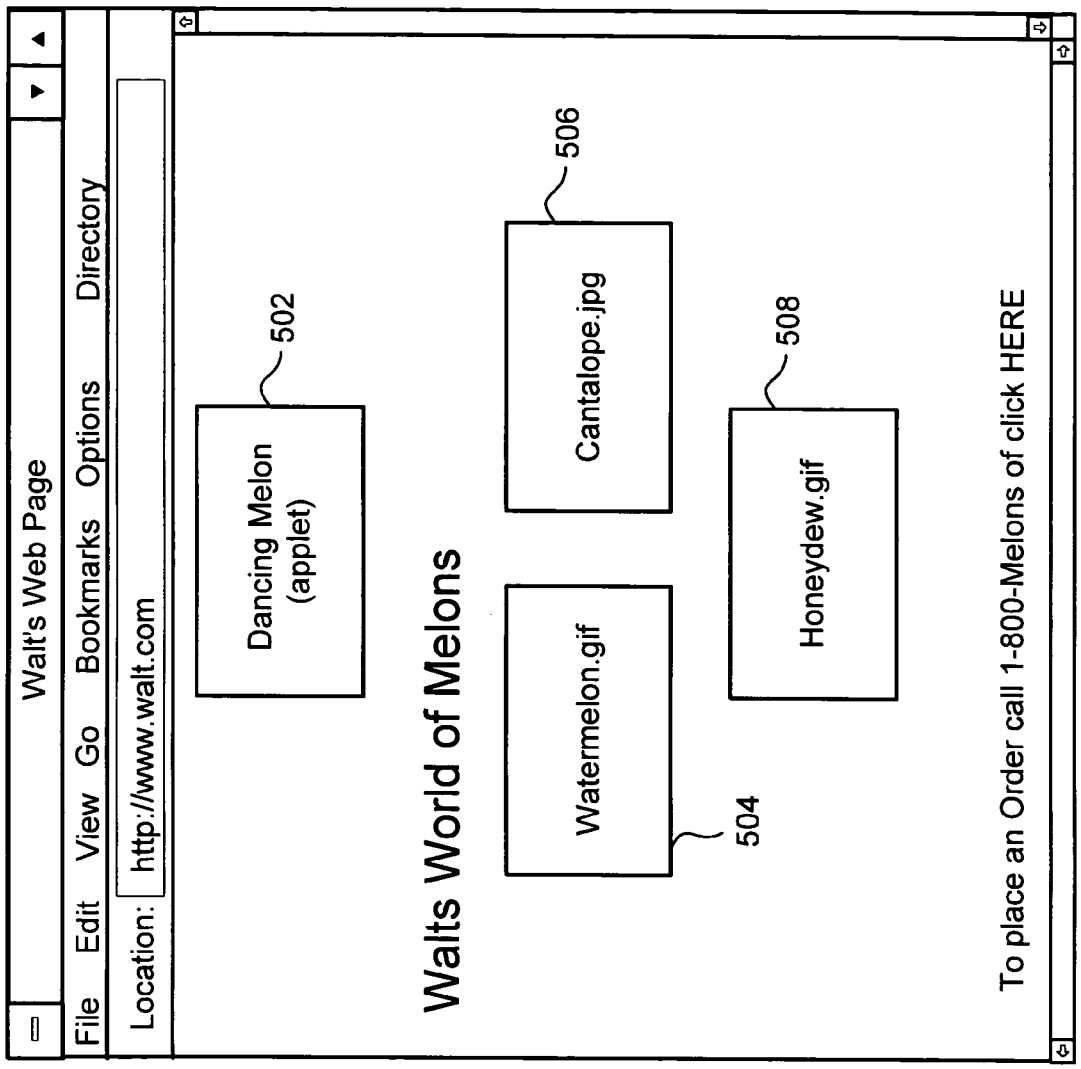
FIG. 5 is a schematic representation of the HTML document of FIG. 4 as it would be rendered by a typical web browser.

In the next step, the web browser renders the components and displays the HTML page with the embedded components to the user. Turning briefly to FIG. 5, the display screen 500 illustrates how the HTML document 400 is displayed by a typical web browser. The display screen includes HTML text and the components referenced in HTML document 400. In particular, the DancingMelon applet 502, the watermelon GIF image 504, the cantaloupe JPEG image 506 and the honeydew GIF image 508 would all be downloaded and displayed by the web browser. Additionally, the background GIF component, not illustrated in FIG. 5, would be downloaded and displayed by the browser. The web browser thus automatically downloads all components referenced in the HTML document.

DETAILED DESCRIPTION

Figure 2:
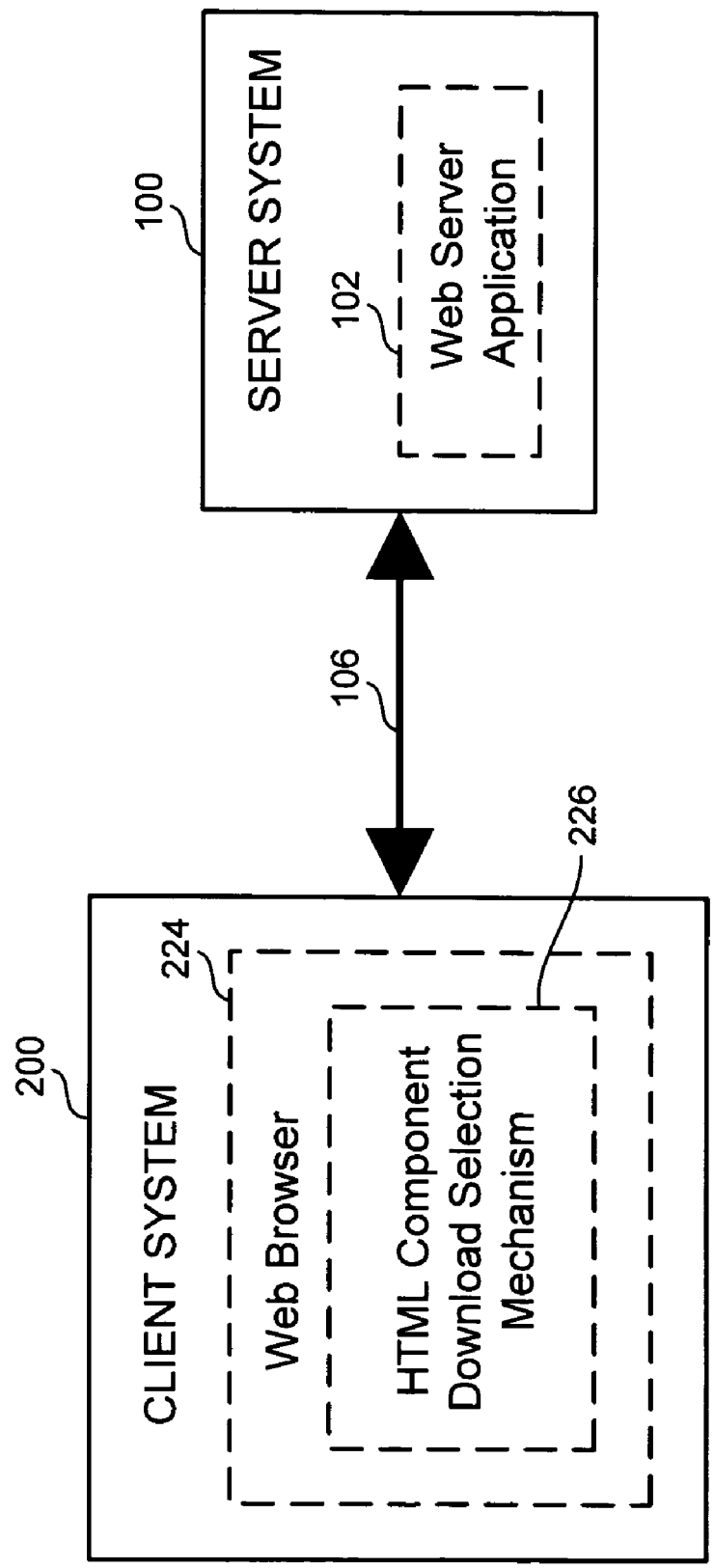
FIG. 2 is a block diagram of a web client system and a web server system.

Referring now to FIG. 2. a client system 200 and a server system 100 are shown to illustrate a preferred embodiment of the present invention. The client system 200 is connected to the server system 100 over network connection 106. The network connection 106 can be any network mechanism, such as a local area network (LAN), a wide-area-network (WAN), or intranet connection, but is preferably an Internet connection allowing the client system 200 to communicate with the server system 100 over the World-Wide-Web.

The server system 100 includes a web server application 102. The web server application 102 communicates with web browser 224 on the client system 200. The web server application 102 delivers files to the web browser 224 over connection 106 when requested by the web browser 224. The web server application 102 can comprise any suitable web server application such as IBM Internet Connection Server, Netscape Web Server, etc.

The client system 200 can be any suitable client system, such as an IBM compatible personal computer. The client system 200 includes a web browser application 224. In accordance with the preferred embodiment, the web browser application 224 includes an HTML component download selection mechanism 226. The HTML component download selection mechanism 226 allows a user of web browser 224 to select which HTML components are downloaded from the web server application 102 by supplying a download selection list to the web user.

Figure 1:
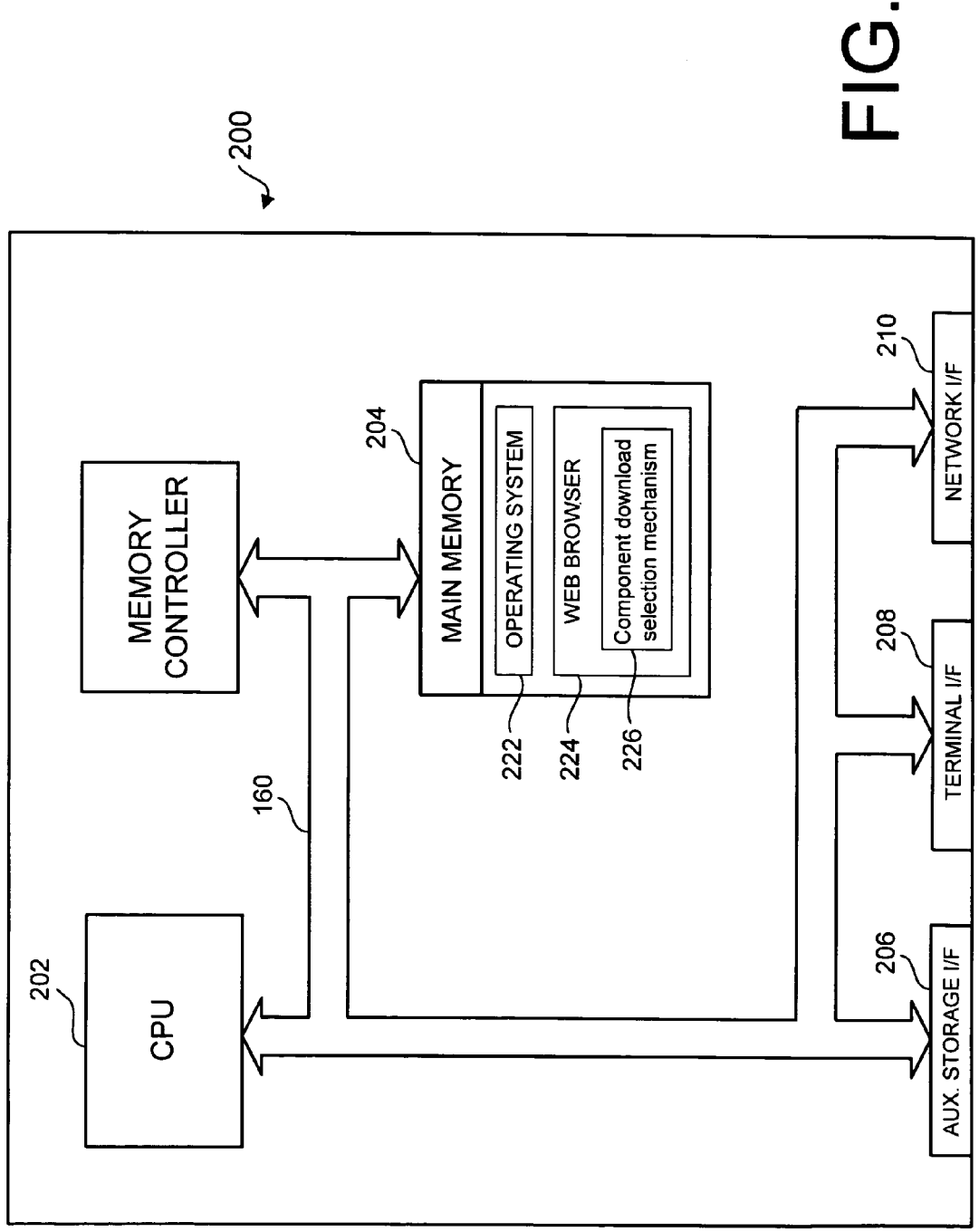
FIG. 1 is a block diagram view of a web client system in accordance with the preferred embodiment.

Turning now to FIG. 1, a block diagram of client computer system 200 in accordance with the present invention is illustrated. The computer system 200 can be any suitable system, such as an IBM compatible personal computer. However, those skilled in the art will appreciate that the mechanisms and apparatus of the present invention apply equally to any computer system, regardless of whether the computer system is a complicated multi-user computing apparatus or a single user personal computer. As shown in the block diagram of FIG. 1, computer system 200 comprises main or central processing unit (CPU) 202 connected to main memory 204, auxiliary storage interface 206, terminal interface 208, and network interface 210. These system components are interconnected through the use of a system bus 160. Auxiliary storage interface 206 is used to connect mass storage devices (such as DASD devices) to computer system 200.

Main memory 204 contains an operating system 222 and a web browser 224. In accordance with the preferred embodiment, the web browser 224 will include an HTML component download selection mechanism 226. HTML component download selection mechanism 226 to allows a user of the web browser 224 to select which, if any, of the HTML components embedded in a web page are to be downloaded. Computer system 200 preferably utilizes well known virtual addressing mechanisms that allow the programs of computer system 200 to behave as if they only have access to a large, single storage entity instead of access to multiple, smaller storage entities such as main memory 204 and DASD devices. Therefore, while operating system 222 and web browser 224 are shown to reside in main memory 204, those skilled in the art will recognize that these programs are not necessarily all completely contained in main memory 204 at the same time. (It should also be noted that the term "computer system memory" is used herein to generically refer to the entire virtual memory of computer system 200.)

Operating system 222 can be any operating system, such as OS/2, Windows, AIX, OS/400 etc, and those skilled in the art will appreciate that the spirit and scope of the present invention is not limited to any one operating system.

Although computer system 200 is shown to contain only a single main CPU and a single system bus, those skilled in the art will appreciate that the present invention may be practiced using a computer system that has multiple CPUs and/or multiple buses.

Terminal interface 208 is used to directly connect one or more terminals to computer system 200. These terminals may be non-intelligent or fully programmable workstations, are used to allow system administrators and users to communicate with computer system 200.

Network interface 210 is used to connect other computer systems and/or workstations to computer system 200 in networked fashion. In the preferred embodiment the network interface 210 includes a connection to the Internet and the World-Wide-Web, but could also be to connect to other networked environments, such as internal web-based systems (typically called intranets). The present invention applies equally no matter how computer system 200 may be connected to other computer systems and/or workstations, regardless of whether the connection is made using present-day analog and/or digital techniques or via some networking mechanism of the future.

It is important to note that while the present invention has been (and will continue to be) described in the context of a fully functional computer system, those skilled in the art will appreciate that the mechanisms of the present invention are capable of being distributed as a program product in a variety of forms, and that the present invention applies equally regardless of a particular type of signal bearing media used to actually carry out the distribution. Examples of signal bearing media include: recordable type media such as floppy disks, CD-ROMs and transmission type media such as digital and analog communication links.

Figure 6:
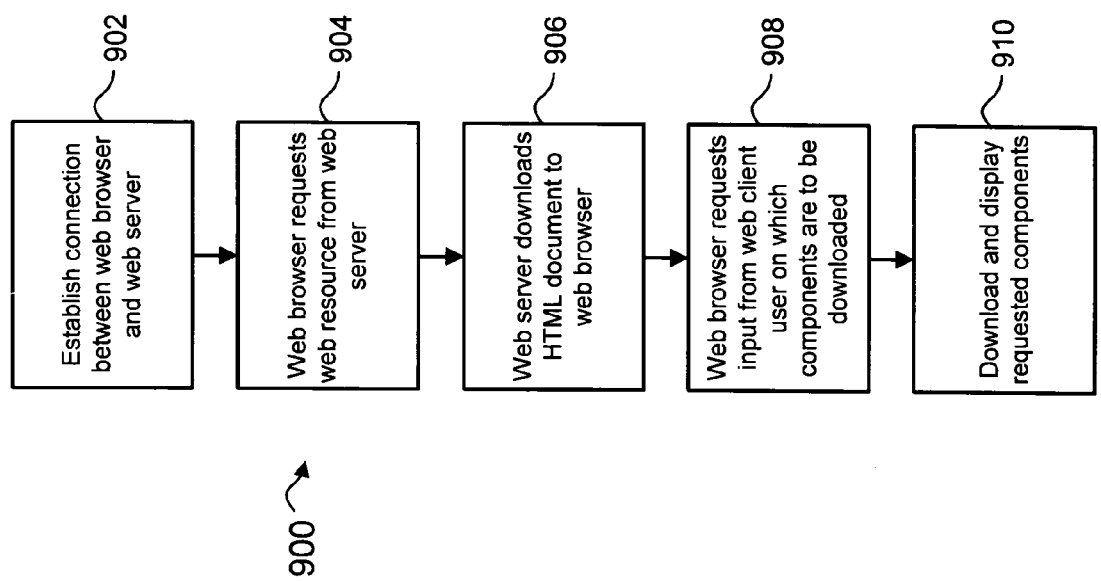
FIG. 6 is a flow diagram of a method in accordance with the preferred embodiment.

Turning to FIG. 6, an HTML download method 900 in accordance with the preferred embodiment is illustrated. The download method 900 gives the web client user the choice of which HTML components to download, and thus allows the user to save time by not downloading components which are not of interest.

The first step 902 is to establish a connection between the web browser 224 and the web server 102. Typically, the web client user enters a Uniform Resource Locator (URL) for a desired web resource into his web browser. The web browser then sends a message to the specified web server specified in the URL requesting that a connection be established. The web server can either accept or reject the request for the connection, and sends a message to the web browser to that effect.

When the connection is established, the next step 904 is for the web browser to send a request for a particular web resource. This involves sending the URL for the web resource to the web server, which is typically done automatically by the web browser after the connection is established. The web server receives the request and either delivers the requested web resource or sends an error message explaining why it cannot.

The next step 906 in delivering the resource to the web browser involves sending the HTML document to the web browser. The HTML document includes the text and formatting information that determines the documents layout. A HTML document may also include references to one or more components. These components can include any item referenced in the HTML page to be downloaded and integrated with the page, such as graphics images, background images, audio, video and multimedia files, forms, applets etc.

In accordance with the preferred embodiment, the component download selection mechanism 226 operates to give the web client user the choice as to which components to download. The web browser parses the references to the components from the HTML document and, in step 908, the web browser requests input from the web user as to which, if any, of the referenced components the web user would like to download. In the preferred embodiment, the request to the web user occurs dynamically, e.g., automatically after the HTML document is downloaded. In the next step 910 the web browser requests from the web server all components selected by the web user. The web server then delivers the requested components or sends an error message indicating it could not fulfill the request.

Figure 7:
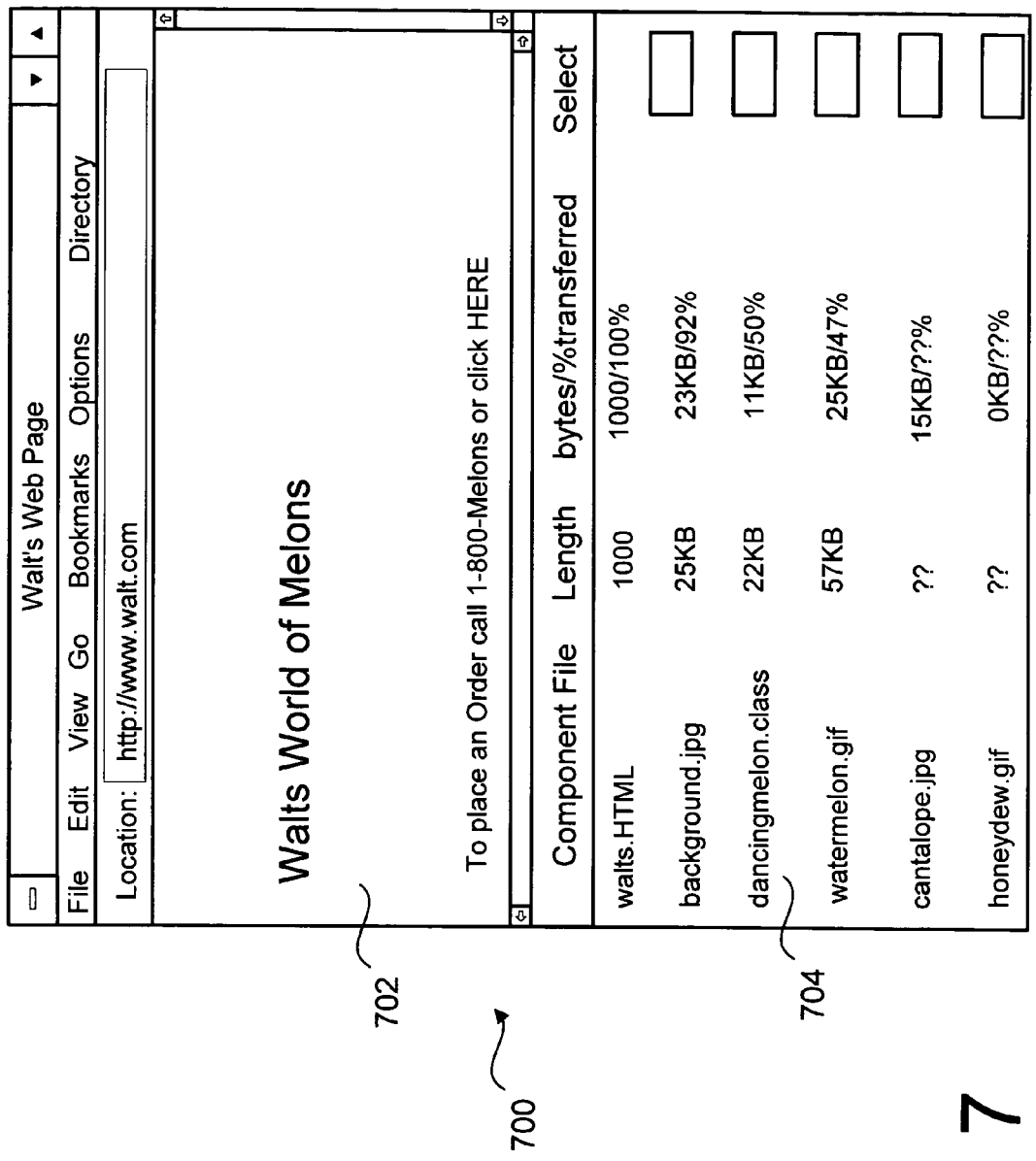
FIG. 7 is a schematic representation of the HTML document of FIG. 4 with a component download list in accordance with the first embodiment.

There are several embodiments that can be used to implement steps 908 and 910 of method 900. For example, turning to FIG. 7, the display screen 700 illustrates how the HTML document 400 of FIG. 4 would be displayed by a web browser in accordance with the first embodiment. In this embodiment after downloading the HTML document 400 the web browser displays two panes of information. In the first pane 702, the web browser displays the text portions of the HTML document 400. In the second pane 704, the component download selection mechanism causes the web browser to display a component download list to allow users to select which components to download. The component download list illustrated in FIG. 7 includes the file name, the length of the file and the number of bytes to transfer, and the percentage of bytes that have been transferred. The list is preferably ordered to reflect the order of downloading. In the illustrated embodiment, the component download selection mechanism allows users to select which components are to be downloaded and does not download any components until selected by the user. In particular, the component download list includes a select button for each component which allows a user to select which components to download.

Of course, this is just one way the component download list could be implemented. For example, the component download list could include other information about the components, such as the title or type. Specifying files by type in the component download list would allow a user to quickly identify certain file types (such as image files) that typically take much longer to download than other types of components. Likewise, the component download list could use color or other means to distinguish components that are being downloaded, those that have been downloaded, and those that have not been selected to be downloaded.

In a variation on this embodiment, the component download selection mechanism begins to automatically download components while allowing users to stop a download by selecting an appropriate item on the component download list.

Figure 8:
FIG. 8 is a schematic representation of the HTML document of FIG. 4 with a component download list in accordance with the second embodiment.

Turning now to FIG. 8, a dialog box 800 illustrates how the HTML document 400 would be displayed by a web browser in accordance with a second embodiment. A dialog box is a type of pop-up window used to request input from the user. In this embodiment after downloading the HTML document 400 the web browser opens a component download list in a separate dialog box which is displayed to the user. Again, the component download list in dialog box 700 allows users to select which components to download. The component download list illustrated in FIG. 8 includes the component file name, the title of the component, the component type, the length of the file and the number of bytes transfer and the percentage of bytes that have been transferred. In this illustrated embodiment, the component download selection mechanism allows users to select which components are to be downloaded by, for example, selecting the component file with an input device such as a mouse, and does not download any components until selected by the user.

This is just one way in which a component download list could be implemented in a dialog box. For example, the component download list could include other information about the components, such as the title or type. Likewise, the component download list could use color or other means to distinguish components that are being downloaded, those that have been downloaded, and those that have not been selected to be downloaded.

Figure 9:
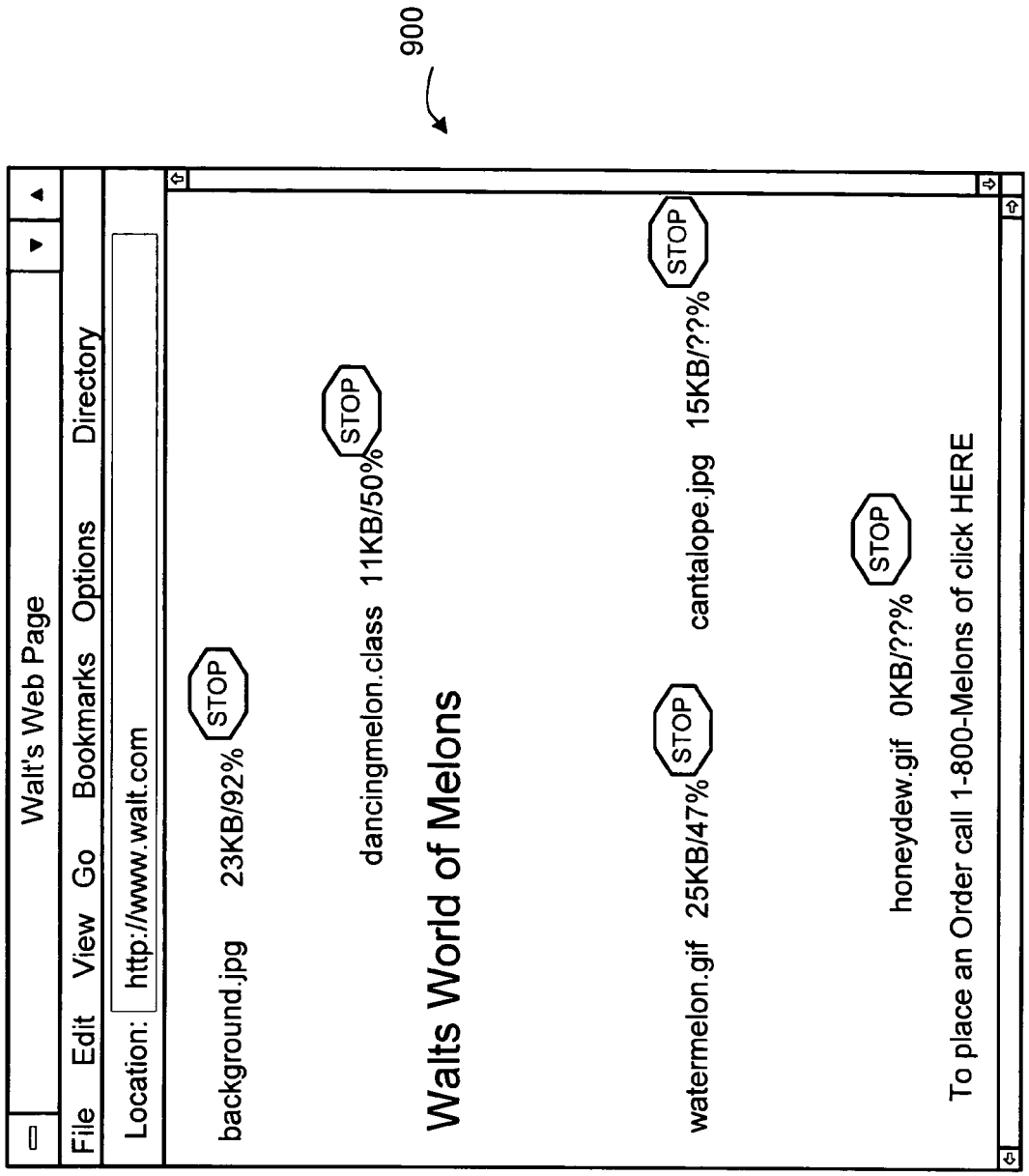
FIG. 9 is a schematic representation of the HTML document of FIG. 4 with a component download list in accordance with the third embodiment.

Turning to FIG. 9, the display screen 900 illustrates how the HTML document 400 would displayed by a web browser in accordance with the third embodiment. In this embodiment after downloading the HTML document 400 the web browser displays the document along with component download information for the various HTML components along with a selection button for each component. The component download information illustrated in FIG. 9 includes the file name, the number of bytes and the percentage of bytes that have been transferred. In the illustrated embodiment, the component download selection mechanism allows users to select which components are not to be downloaded by hitting the its associated stop button. In variation on this embodiment, the stop buttons are replaced by "get" buttons that, when selected, cause the browser to request the associated component.

Thus, the preferred method and apparatus provide a mechanism for selectively downloading components over the World-Wide-Web. The preferred embodiment allows a web user to decide which components to download and which to not, thereby giving the web user more control over the speed of their Internet accesses. The preferred method produces a table or chart of components and allows the web user to select which components are downloaded.

The invention claimed is:

1. An apparatus comprising:
   at least one processor;
   a memory coupled to the at least one processor; and
   a computer program residing in the memory, said computer program commencing to download a file referencing a plurality of components, said computer program dynamically prompting a user to select which of said plurality of components to download after commencing to download the file.

2. The apparatus of claim 1 wherein said computer program comprises a web browser application.

3. The apparatus of claim 1 wherein said file comprises a hypertext markup language (HTML) document.

4. The apparatus of claim 1 wherein said computer program includes a component download selection mechanism, said component download selection mechanism dynamically creating a component download selection list when said file with said plurality of components is downloaded.

5. The apparatus of claim 4 wherein said computer program comprises a web browser and wherein said component download selection list is formed in a second pane of said web browser and displayed with said file.

6. The apparatus of claim 4 wherein said component download selection list is formed in a dialog box.

7. The apparatus of claim 4 wherein the component download list is inserted into said file and displayed to a user with said file.

8. The apparatus of claim 4 wherein said component download selection list contains the file name for each of said plurality of components.

9. The apparatus of claim 4 wherein said component download selection list contains the type for each said plurality of components.

10. The apparatus of claim 4 wherein said component download selection list contains the size of each said plurality of components.

11. The apparatus of claim 4 wherein said component download selection list includes a status item, said status item dynamically displaying the amount of each of said plurality of components that has been downloaded.

12. The apparatus of claim 11 wherein said status item includes the percentage of a component downloaded.

13. A method for downloading a document, the document including a document with references to a plurality of components, the method comprising the steps of:
   a) downloading said document;
   b) prompting a user to select which of said plurality of components to download after downloading of said document has commenced; and
   c) downloading said selected components.

14. The method of claim 13 wherein the document comprises an HTML document.

15. The method of claim 13 wherein the step of prompting a user to select which of said plurality of components to download comprises displaying a component download selection list.

16. The method of claim 15 wherein said component download selection list comprises a dialog box.

17. The method of claim 15 wherein said component download selection list comprises is displayed in a pane in a web browser.

18. The method of claim 15 wherein said component download selection list is inserted into said document.

19. The method of claim 15 wherein said component download selection list comprises the file name for each of said plurality of components.

20. The method of claim 15 wherein said component download selection list comprises the type for each said plurality of components.

21. The method of claim 15 wherein said component download selection list comprises the size for each said plurality of components.

22. The method of claim 13 wherein said component download selection list comprises a status item, said status item dynamically displaying the amount of each of said plurality of components that has been downloaded.

23. The method of claim 22 wherein said status item includes the percentage of a component downloaded.

24. A program product comprising:
  (a) a computer program, said computer program commencing to download a file referencing a plurality of components, said computer program dynamically prompting a user to select which of said plurality of components to download after commencing to download the file; and
  (b) a recordable type media bearing said computer program.

25. The program product of claim 24 wherein said computer program includes a component download selection mechanism, said component download selection mechanism dynamically creating a component download selection list when said file with said plurality of components is downloaded.

26. The program product of claim 25 wherein said component download selection list is formed in a dialog box.

27. The program product of claim 25 wherein the component download list is inserted into said file and displayed to a user with said file.

28. The program product of claim 25 wherein said component download selection list contains the file name for each of said plurality of components.

29. The program product of claim 25 wherein said component download selection list contains the type for each said plurality of components.

30. The program product of claim 25 wherein said component download selection list contains the size of each said plurality of components.

31. The program product of claim 25 wherein said component download selection list includes a status item, said status item dynamically displaying the amount of each of said plurality of components that has been downloaded.

32. The program product of claim 24 wherein said computer program comprises a web browser application.

33. The program product of claim 24 wherein said file comprises a hypertext markup language (HTML) document.

34. An apparatus comprising:
  at least one processor;
  a memory coupled to the at least one processor; and
  a web browser application residing in the memory, said web browser application including a component download selection mechanism, said component download selection mechanism dynamically creating a component download selection list when an HTML document with a plurality of components is downloaded, said component download selection mechanism prompting a user to select which of said plurality of components to download.

35. A method for downloading an HTML document from a web server to a web browser, the document including a document with references to a plurality of embedded components, the method comprising the steps of:
  a) requesting said HTML document from said web server;
  b) parsing said HTML document for references to said plurality of embedded components;
  c) prompting a user to select which of said plurality of embedded components to download by displaying a component download selection list on said web browser; and
  d) requesting from said web server said selected embedded components.

36. An apparatus comprising:
  at least one processor;
  a memory coupled to the at least one processor; and
  a computer program residing in the memory, said computer program commencing to download a file referencing a plurality of components, said computer program dynamically prompting a user to select which of said plurality of components to download after commencing to download the file, wherein the computer program is further configured to receive user input that selects at least one of the plurality of components, to commence to download at least one selected component from the plurality of components, and to display the file with the selected component embedded therein.

* * * * *